(12) United States Patent
Beer et al.

(10) Patent No.: US 7,729,569 B2
(45) Date of Patent: Jun. 1, 2010

(54) OPTICAL TRANSMITTER AND/OR RECEIVER ASSEMBLY COMPRISING A PLANAR OPTICAL CIRCUIT

(75) Inventors: Gottfried Beer, Nittendorf (DE); Hans-Ludwig Althaus, Lappersdorf (DE)

(73) Assignee: Ezconn Corporation, Taipei (TW)

( * ) Notice: Subject to any disclaimer, the term of this patent is extended or adjusted under 35 U.S.C. 154(b) by 248 days.

(21) Appl. No.: 10/537,717

(22) PCT Filed: Dec. 5, 2002

(86) PCT No.: PCT/DE02/04509
§ 371 (c)(1),
(2), (4) Date: Dec. 6, 2007

(87) PCT Pub. No.: WO2004/051335
PCT Pub. Date: Jun. 17, 2004

(65) Prior Publication Data
US 2008/0101750 A1 May 1, 2008

(51) Int. Cl.
*G02B 6/12* (2006.01)
*G02B 6/30* (2006.01)
*G02B 6/32* (2006.01)
(52) U.S. Cl. ............... 385/14; 385/33; 385/49
(58) Field of Classification Search ........... 385/14, 385/33, 49
See application file for complete search history.

(56) References Cited

U.S. PATENT DOCUMENTS

| | | | |
|---|---|---|---|
| 4,726,645 A | 2/1988 | Yamashita et al. | |
| 4,875,750 A | 10/1989 | Spaeth et al. | |
| 4,969,712 A * | 11/1990 | Westwood et al. | 385/14 |
| 5,400,419 A * | 3/1995 | Heinen | 385/14 |
| 5,848,211 A | 12/1998 | Yang et al. | |
| 5,854,867 A | 12/1998 | Lee et al. | |
| 6,393,169 B1 * | 5/2002 | Paniccia et al. | 385/14 |
| 6,611,635 B1 * | 8/2003 | Yoshimura et al. | 385/14 |
| 6,731,882 B1 * | 5/2004 | Althaus et al. | 385/14 |
| 6,939,058 B2 * | 9/2005 | Gurevich et al. | 385/93 |

\* cited by examiner

*Primary Examiner*—Charlie Peng
(74) *Attorney, Agent, or Firm*—GSS Law Group

(57) ABSTRACT

The invention relates to an optical transmitter and/or receiver assembly comprising at least one transmitter component (2) and/or at least one receiver component (3, 4), in addition to a planar optical circuit (5) with at least one integrated waveguide (51). According to the invention, light from the transmitter element (1) is coupled into a waveguide (51) of the planar optical circuit (5) and/or light from the waveguide (51) of the planar optical circuit (5) is uncoupled and guided onto the receiver component (3, 4). The assembly is provided with a lens (14, 15) for optically coupling the waveguide(s) (51) of the planar optical circuit (5) to a fiber-optic that can be fixed to the transmitter and/or receiver assembly (1), said lens (14, 15) being positioned on the planar optical circuit (5).

2 Claims, 3 Drawing Sheets

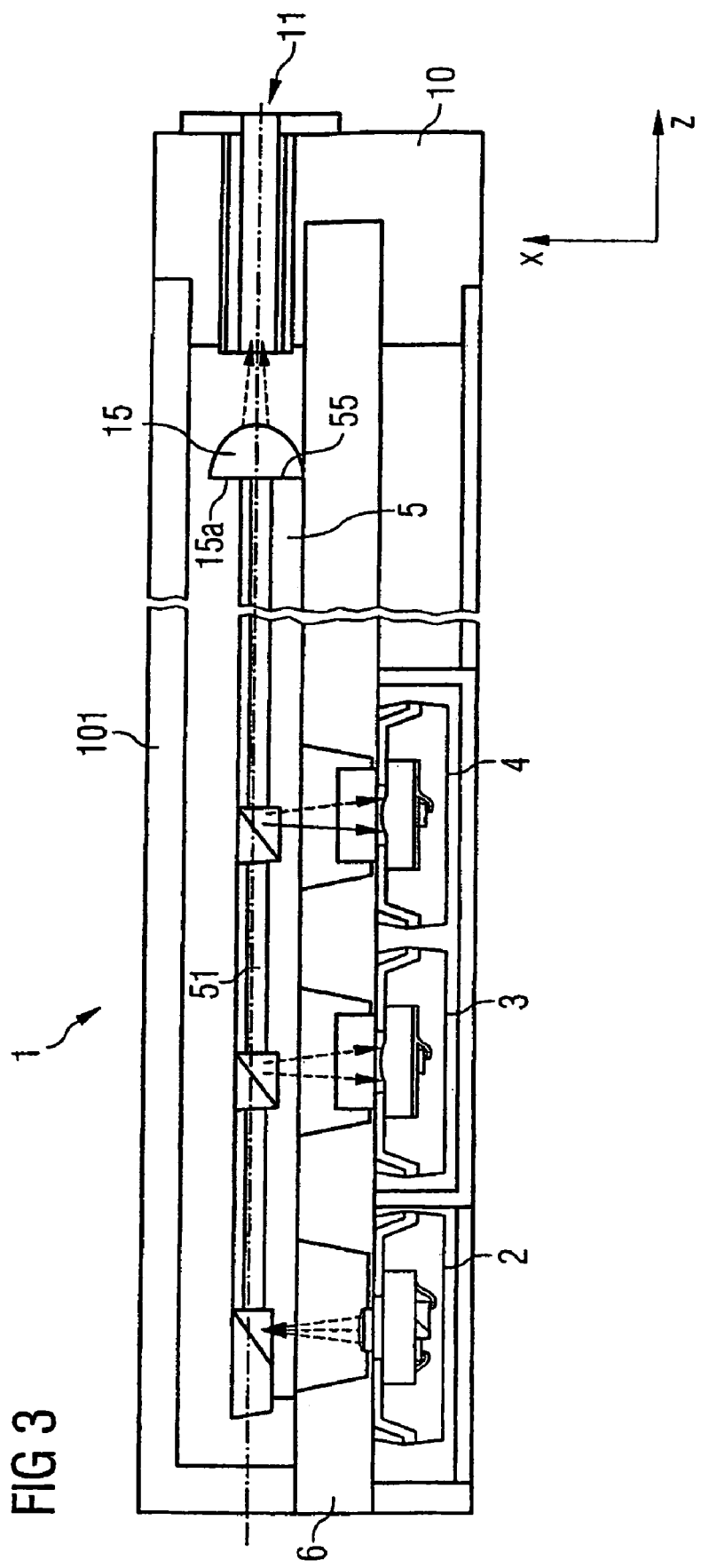

OPTICAL TRANSMITTER AND/OR RECEIVER ASSEMBLY COMPRISING A PLANAR OPTICAL CIRCUIT

The invention relates to an optical transmitter and/or receiver assembly in accordance with the preamble of claim 1. It is suitable in particular for a precise coupling of an optical fiber to an optical transmitter and/or receiver module comprising a planar optical circuit.

For the purpose of coupling an optical fiber to a transmitter and/or receiver assembly comprising transmitter and receiver components in a TO design, it is known for example from WO 99/57594 A1 to couple the light beam to the end area of the optical fiber via a lens, in particular a spherical lens. The optical fiber is usually arranged in a ferrule, which is in turn pressed or adhesively bonded into a metal flange. The metal flange is fixedly welded to the housing of the transmitter and/or receiver device. The known construction is very robust and insensitive toward temperature fluctuations, but suitable only for TO designs.

Furthermore, it is known to insert a glass fiber or a fiber array into a V-groove or into V-grooves in a substrate and to fix it therein. In many cases, an additional cover is placed on at the top to give a stabler mechanical fixing. The substrate provided with V-grooves is also referred to as a "microbench". The fibers are strain-relieved at a housing. In this case, the housing bushing for the fibers is positioned as near as possible to the "microbench". However, such an arrangement has the disadvantage that, owing to the virtually unavoidable stresses between the different materials having different thermal expansion, the fixing of the fibers in the V-grooves may be misaligned, displaced or even released as a result of shear and/or buckling stresses.

Planar optical circuits (PLC—Planar Light Circuit) having a wave-guiding layer on a planar carrier substrate are furthermore known. For the purpose of coupling the light signals from a transmitter component into the wave-guiding layer or for the purpose of coupling received light signals to a receiver component, wavelength-selective filters or other wavelength-selective deflection means are provided in the beam path and couple the light into or out of the plane of the planar optical circuit.

From the two above-described ways of coupling and fixing an optical fiber to a transmitter and/or receiver assembly, solely the use of V-grooves is conceivable in the case of a planar optical circuit on account of the planar geometry, optical fibers being introduced into said grooves, the optical fibers being led via the V-grooves for example to near the planar optical circuit and the integrated waveguide thereof. Such an arrangement is disadvantageously associated with a high production and alignment outlay.

Accordingly, the present invention is based on the object of providing an optical transmitter and/or receiver assembly comprising a planar optical circuit which enables an optical fiber to be coupled to the transmitter and/or receiver assembly in a simple, precise and reliable manner.

The object is achieved according to the invention by means of an optical transmitter and/or receiver assembly having the features of claim 1. Preferred and advantageous refinements of the invention are specified in the subclaims.

Accordingly, the solution according to the invention is distinguished by the fact that provision is made of a lens for optically coupling the at least one waveguide of the planar optical circuit to an optical fiber that can be fixed to the transmitter and/or receiver assembly, the lens being arranged on the planar optical circuit. Via the lens, a direct coupling to the end area of an optical fiber to be coupled is effected without necessitating the provision of a V-groove for the optical fiber to be coupled.

The arrangement of the lens on the planar optical substrate enables a compact configuration with few parts that have to be separately aligned with respect to one another. At the same time, the risk of misalignment of the lens relative to the planar substrate is reduced.

A lens in the sense of the invention is any beam shaping element and any combination of beam shaping elements. Consequently, an individual lens body such as a spherical lens, an etched lens structure or a lens system or some other system of beam shaping elements may be involved.

In one preferred refinement of the invention, the lens is arranged in a cutout on the surface of the planar optical circuit. In this case, a free-radiation region lies between the lens and the waveguide of the planar optical circuit, on the one hand, and the lens and the optical fiber, on the other hand. The cutout is preferably formed in the shape of a pyramid, in particular in the shape of a truncated pyramid. It extends in the carrier substrate of the planar optical circuit and is introduced into the carrier substrate by etching or milling, by way of example. The cutout is formed with high precision during the production of the planar optical circuit, so that a lens inserted into the cutout is positioned and aligned with high precision relative to an assigned integrated optical waveguide of the planar optical circuit. For the coupling of an optical fiber, it is merely necessary for the imaging spot of the lens to be aligned with the end area of the optical fiber just by displacing the optical fiber. A simple and stable coupling of an optical fiber is thus provided.

The lens is preferably a spherical lens that is placed into the cutout and, if appropriate, additionally fixed therein.

In an alternative refinement of the invention, the lens is arranged at the end side on an end area of the planar optical circuit. In this case, the lens is fixed to the end area of the planar optical circuit by means of an index-matched adhesive, in order to minimize backreflections.

In this refinement, the lens is preferably a planoconvex lens, the plane side of which is fixed to the end side of the planar optical circuit. This makes it possible, in a simple manner, for the lens to be linked to the end area of the planar optical circuit in a defined manner. In principle, however, the lens may also have other forms.

It is preferably provided that the at least one receiver component in each case detected light having a different wavelength and the waveguide in each case has coupling-out and deflection means which couple out the received light for each received wavelength wavelength-selectively from the plane of the planar optical circuit and guide it onto an assigned receiver component. A receiver component is preferably respectively assigned a wavelength-selective filter, so that only the light having the assigned wavelength is detected and light having other wavelengths is blocked.

The coupling-out and deflection means may be for example a Mach-Zehnder component and an assigned deflection prism, light having a specific wavelength being coupled out from the waveguide by the Mach-Zehnder component, being fed to the deflection prism and being deflected by the latter onto the receiver component.

In another refinement, the coupling-out and deflection means are in each case formed by a wavelength-selectively coated mirror area which interrupts the waveguide of the planar optical circuit under consideration in an oblique arrangement and couples out light having a specific wavelength from the waveguide, while it is transparent to light having other wavelengths.

In a further refinement of the invention, the planar optical circuit is arranged on the top side of a substrate, which is preferably a printed circuit board. At least one transmitter component and the at least one receiver component are arranged on the underside of the substrate or the printed circuit board. For a passage of light, a cutout is preferably provided in each case in the printed circuit board. The transmitter component and/or the receiver component are preferably prefabricated and pretestable housed modules that can be mounted on the underside of the printed circuit board by SMD mounting. In this refinement, the planar optical circuit and the transmitter and receiver components can be positioned and at the same time electrically contact-connected with respect to one another in a simple manner.

The transmitter and/or receiver assembly preferably has a housing having a receptacle opening for the coupling of an optical fiber. In this case, the optical fiber can be fixed to the housing at a specific distance from the lens. The receptacle opening is formed as a plug receptacle, for example. It serves in particular for receiving a glass fiber arranged in a ferrule. In this case, it may be provided that the cutout is provided with a metal sleeve into which the optical fiber or a ferrule surrounding the optical fiber can be plugged. This provides a fixed linking of the optical fiber to the housing and the transmitter and/or receiver assembly.

In the case of lenses made of a material having a high refractive index such as silicon lenses, by way of example, it may be provided that the free-radiating region between lens and waveguide is potted with an optically transparent medium for protection against ambient influences. In such a case, provision may additionally be made for filling the rest of the housing with an optically nontransparent material, thereby increasing the protection against external influences and furthermore saving a cover that would otherwise have to be fitted to the housing of the arrangement. However, a potting with a nontransparent medium presupposes that the optical fiber to be coupled is already aligned prior to potting. This refinement is appropriate particularly when coupling a fiber stub to the housing.

The invention is explained in more detail below on the basis of a plurality of exemplary embodiments with reference to the figures of the drawing, in which:

FIG. 3 shows a sectional view of a second embodiment of an optical transmitter and/or receiver assembly, it being possible to couple an optical fiber to the waveguide of a planar optical circuit via a planoconvex lens.

Figure 1:
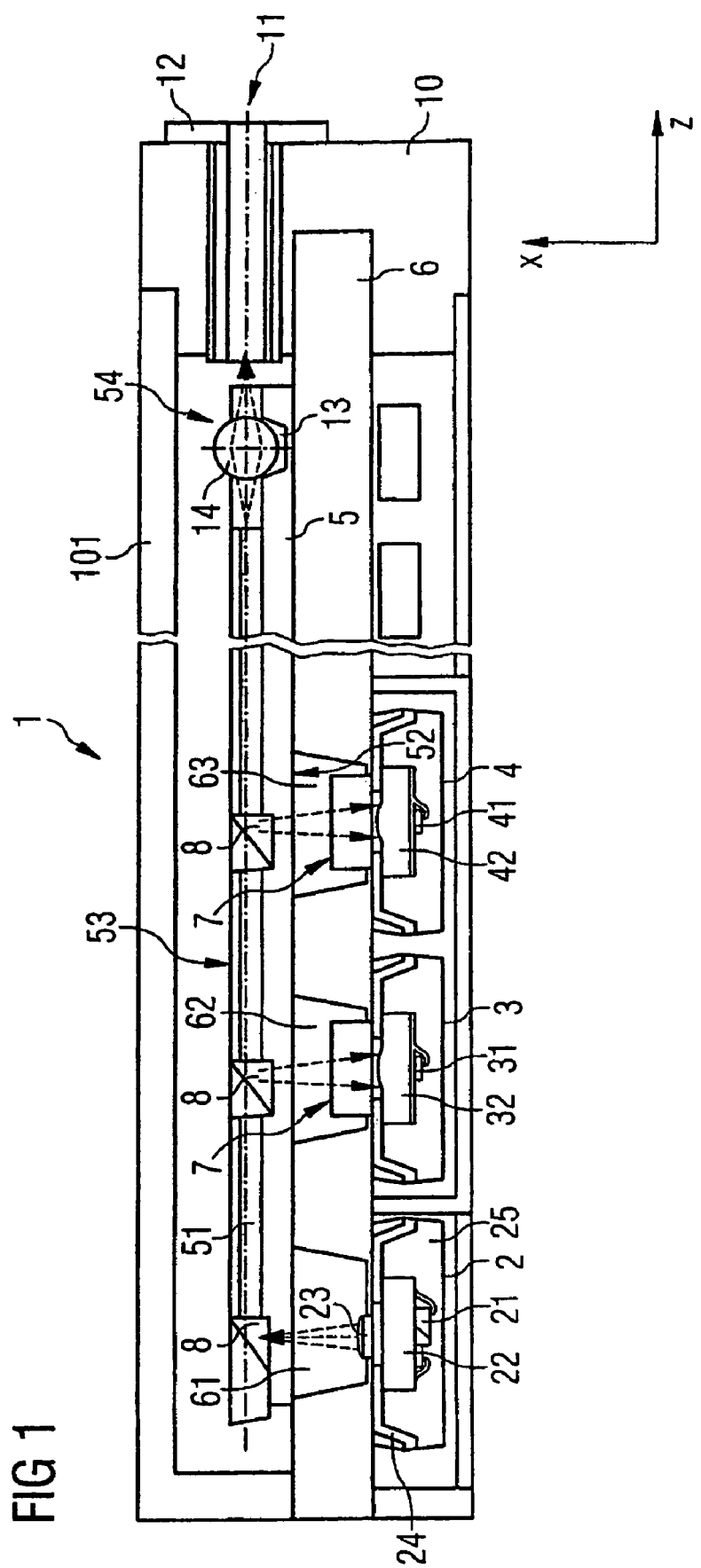
FIG. 1 shows a sectional view of a first embodiment of an optical transmitter and/or receiver assembly, it being possible to couple an optical fiber to the waveguide of a planar optical circuit via a spherical lens.
Figure 2:
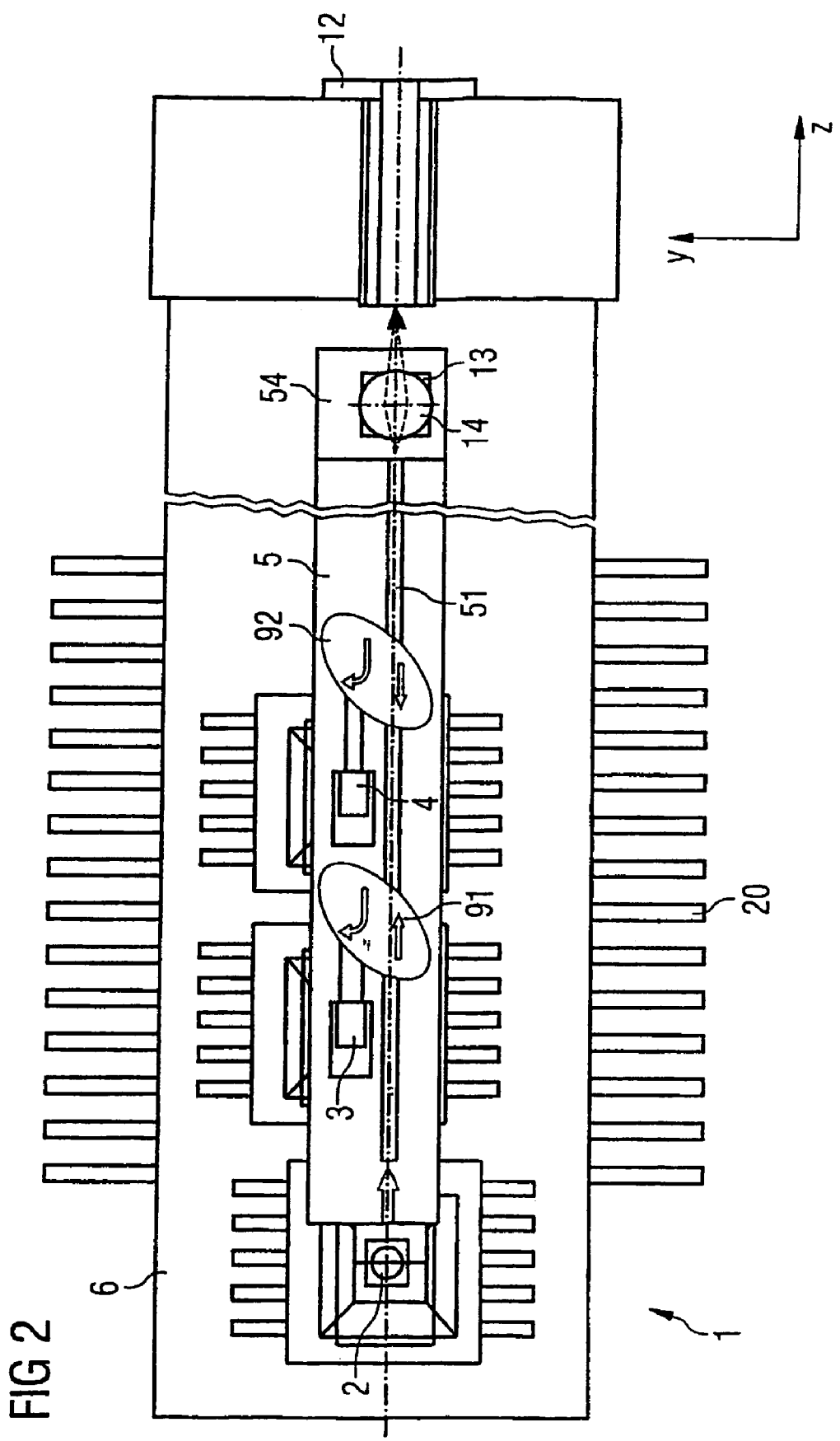
FIG. 2 show a plan view of the arrangement of the FIG. 1.

FIGS. 1 and 2 show an optical transmitter and/or receiver assembly 1 to which an optical fiber can be coupled. In the exemplary embodiment illustrated, the transmitter and/or receiver assembly 1 is formed as a 3-port bidirectional transmitter and receiver module having one transmitter component 2 and two receiver components 3, 4.

The light to be coupled in or out is guided in a waveguide 51 of a planar optical circuit and coupled into or out of an optical fiber from the waveguide 51 of the planar optical circuit 5, as will be explained in detail below. In this case, the optical fiber to be coupled is preferably a glass fiber, in particular a single-mode glass fiber which also transports light signals having different wavelengths.

The planar optical circuit is embodied for example using $SiO_2$ on Si technology. For production, three $SiO_2$ layers are applied on a silicon wafer, said layers usually being referred to as buffer layer, core layer and cladding layer and having different refractive indices in each case. In this case, the central core layer has the largest refractive index. Before it is covered with the outer cladding layer, it is patterned with the aid of a mask produced photolithographically and an etching method, so that only individual ribs of said layer remain. These ribs are coated with the cladding layer and then form the light-guiding waveguide core which is situated in a manner buried approximately 20 µm in an approximately 40 µm thick $SiO_2$ layer system and usually has a cross section of approximately 6×6 µm. A wave-guiding layer 53 with at least the integrated optical waveguide 51 is thus provided on a planar carrier substrate 52.

It is also possible to use different material systems than $SiO_2$ on Si, for example the material systems Si(Ge) on Si, lithiumoniobate ($LiNbO_3$) or InGaAsP on InP.

The planar optical circuit 5 is arranged on one side, the upper side in the exemplary embodiment illustrated, of a printed circuit board 6 or more generally of a substrate 6. The transmitter component 2 and the receiver components 3, 4 are situated on the other, lower side of the printed circuit board 6. In order to enable a light coupling between the transmitter element 2 and the receiver elements 3, 4 and the planar optical circuit 5, the printed circuit board has a cutout 61, 62, 63 in each case in the region of the components 2, 3, 4. As an alternative, the printed circuit board 6 is composed of a material that is transparent to the wavelengths used.

The transmitter component 2 has a laser diode 21, which is arranged on the rear side of a carrier 22 and is electrically contact-connected in a customary manner. The top side of the carrier 22 has a lens 23, which focuses the light that is emitted by the laser diode 21 and radiated through the carrier 22, and radiates it through the window 61 in the printed circuit board 6 in the direction of the planar optical circuit 5. In this case, the lens 23 may be adhesively bonded onto the carrier 22 or be integrated into the carrier.

The carrier 22 with the components mentioned is arranged on a leadframe 24, by means of which the transmitter component 2 is electrically contact-connected. The arrangement is preferably enveloped by a nontransparent plastic 25 and is situated in a plastic housing (e.g. TSSOP design).

The two receiver components 3, 4 are constructed in a corresponding manner. In this case, instead of a transmitter diode, a receiver diode 31, 41 is respectively arranged on the underside of a carrier 32, 42. The respective carrier 22, 32, 42 is optically transparent to the light wavelengths used, which preferably lie in the windows at 1310 nm and 1550 nm.

A schematically illustrated blocking filter 7 is in each case assigned to the receiver components 3, 4. The blocking filter 7 is in each case arranged in such a way that light coupled out from the planar optical waveguide 5 is radiated through said filter. However, it is transparent only to the respectively assigned wavelength that is to be detected by the assigned receiver component 3, 4, while other wavelengths are blocked.

Light signals emitted by the transmitter component 2 are coupled into the waveguide 51 of the planar optical circuit 5, or light signals are coupled out from the waveguide 51 of the planar optical circuit 5 and deflected onto the receiver components 3, 4, by means of prisms 8 which couple the light from the transmitter component 2 into the integrated optical waveguide 51 and the plane of the planar optical circuit 5, or couple light that has been received from a coupled optical fiber and guided in the optical waveguide 51 out of the plane of the planar optical circuit 5 and deflect it in the direction of the respective receiver component 3, 4.

As can be discerned in particular in the plan view of FIG. 2, means that effect a wavelength-selective deflection of the received light onto the respective receiver component 3, 4 are in each case integrated into the planar optical circuit 5. In the exemplary embodiment illustrated, said means are a Mach-Zehnder interferometer 91, 92, which is only illustrated schematically in FIG. 2. Through suitable tuning of the Mach-Zehnder interferometer, only the light having a specific wavelength is coupled out from the optical waveguide 51, subsequently guided onto the associated prism 8 and deflected by the latter out of the plane of the planar optical circuit 5 onto the respective receiver component 3, 4. What is thereby achieved is that only light having a specific wavelength in each case is received by a receiver component 3, 4.

It is pointed out here that a wavelength-selective coupling-out of light from the optical waveguide 51 may also be effected in a different way. For instance a mirror or some other deflection device may be use instead of the prism 8. It is also possible to use a wavelength-selective coupler in combination with a deflection device or a mirror provided with a wavelength-selective layer, which intersects the optical waveguide 51 in oblique orientation and for this purpose is inserted for example into a cutout in the planar optical substrate 5 running obliquely with respect to the surface. Light having a specific wavelength is then coupled out in each case at the wavelength-selective mirror, while the light having other wavelengths passes undisturbed through the wavelength-selective mirror. Corresponding mirrors or filters are known per se.

The transmitter and receiver module 1 is situated in a housing 10 with a cover 101. The housing 10 with the cover 101 completely encloses the component described apart from a coupling region or a receptacle opening 11 for an optical fiber. In this case, the housing 10 may comprise individual housing sections connected to one another. It is preferably provided with a shield against electromagnetic interference radiation in order to avoid crosstalk.

It is necessary, then, to provide an optical coupling between an optical fiber inserted into the receptacle opening 11 and the integrated waveguide 51 of the planar optical circuit. For this purpose, the planar optical circuit 5 has, at its end region facing the receptacle opening 11, a region 54 in which no wave-guiding layer is provided on the Si carrier substrate 52. The carrier substrate 52 thus forms the upper termination of the planar optical circuit in this region.

A cutout 13 is then introduced into the carrier substrate 52 in the region 54, said cutout having the form of a truncated pyramid in the preferred exemplary embodiment illustrated. A spherical coupling lens 14 is inserted into the cutout 13. As indicated by the arrows, a light coupling between the waveguide 51 of the planar optical circuit 5 and a coupled optical fiber is effected via the couplings 14.

The pyramidal cutout 13 is introduced into the carrier substrate 52 of the planar optical circuit 5 with high precision e.g. by means of anisotropic etching (micromachining). The lens 14 can thereby be positioned with high precision relative to the integrated optical waveguide 51. A free-radiating region is provided in each case between lens 14 and integrated optical waveguide 51 or optical fiber.

The alignment of an optical fiber to be coupled only has to be effected in the x, y plane, for example by displacement of a sleeve 12 which the housing has in the region of the receptacle opening 11. The sleeve 12 can then be fixed after alignment e.g. by means of laser welding.

The coupling illustrated manages without forming a V-groove that would receive an optical fiber in the longitudinal direction. The optical fiber only has to be coupled to the housing in the receptacle region 11. A cost-effective configuration formed in a simple manner is afforded which does not exhibit the risk of misalignment even in the event of thermal stresses since it avoids a mechanical connection between fiber and waveguide.

In the region of the receptacle opening 11, the housing has the metal sleeve 12 that serves for receiving a suitable fiber plug or for receiving a so-called "fiber stub", i.e. an optical fiber that is arranged in a ferrule and projects from the housing and can be coupled to further optical fibers. The optical fiber to be coupled, with the ferrule surrounding it, is fixedly connected to the housing 10 together with the sleeve 12 after alignment, for instance by adhesive bonding, welding, etc., to give a fixed, resistant fixing of the optical fiber to the housing 10. An alternative provides a releasable or pluggable connection of an optical fiber to be coupled in the receptacle region 11.

FIG. 2 additionally reveals that the transmitter and receiver module 1 is provided with contact legs 20 enabling SMD mounting on a printed circuit board, for instance. The coupling region 11 is arranged for example in the region of a backplane of such a printed circuit board, so that an optical fiber can be coupled via the backplane in an easily accessible manner.

The exemplary embodiment illustrated in FIG. 3 differs from the exemplary embodiment of FIGS. 1 and 2 merely in the configuration of the coupling between the integrated optical waveguide 51 of the planar optical circuit 5 and an optical fiber to be coupled. In accordance with FIG. 3, a planoconvex lens 15 is adhesively bonded by its plane rear side 15a directly onto the end area 55—facing the receptacle opening 11 of the housing 10—of the planar optical circuit 5. Light emerging from the optical waveguide 51 at the end side is thus coupled directly into the lens 15. In this case, the optical transition between optical waveguide 51 and lens 15 is index-matched by means of an adhesive with a corresponding refractive index, in order to avoid reflections. In this configuration, too, the coupling means, i.e. the lens 15, is arranged on the planar optical circuit 5 to be of a compact arrangement. A free-radiation region is present between the lens 15 and an optical fiber inserted into the receptacle opening 11.

The alignment is preferably effected actively by displacement of the lens given a fixed fiber or, given a pre-fixed lens, by displacement of the sleeve 12 as explained with reference to FIG. 1.

The diameter of the plane rear side 15a of the lens 15 preferably essentially corresponds to the thickness of the planar optical circuit.

It is pointed out that, in the case of the exemplary embodiments of FIGS. 1 to 3, with the use of a lens 14, 15 having a high refractive index, the coupling region with the lens 14, 15 and the respective free-radiation regions may be potted with a transparent potting material that protects the light path against contaminants and moisture and furthermore takes up mechanical stresses, thereby counteracting a misalignment. In this case, having a high refractive index is taken to mean a refractive index that lies sufficiently above the refractive index of the transparent potting material in order to provide an expedient light refraction in the lens.

Moreover, with the use of lenses having a high refractive index, the housing may otherwise be filled with a nontransparent potting material, the alignment of the optical fiber having to be carried out prior to potting. A cover 101 for the housing 10 is not necessary in that case.

Furthermore, it is pointed out that the exemplary embodiments illustrated are merely to be understood by way of example and the invention is not restricted to these exemplary embodiments. For example, provision may be made for providing a different number of transmitter and receiver components. It is also conceivable to form the module merely as a transmitter unit comprising one or more transmitter components or merely as a receiver unit comprising one or more receiver components.

Furthermore, it likewise lies within the scope of the invention for not just one waveguide 51 but a multiplicity of corresponding waveguides to be arranged parallel to one another in the planar optical circuit 5, which waveguides are then respectively assigned one or more transmitter and/or receiver elements. The receptacle opening 11 of the housing would then constitute an array of receptacle openings. The coupling between the individual integrated optical waveguides and the optical fibers to be coupled is effected as described in each case via coupling means 14, 15 arranged on the planar optical circuit 5.

The invention claimed is:

1. An optical transmitter and receiver assembly comprising:
    at least one transmitter component (2);
    at least one receiver component (3, 4);
    a lens (14, 15) for the optical coupling of the at least one transmitter component or the at least one receiver component to an optical fiber;
    a planar optical circuit (5) consisting of one integrated waveguide (51);
    a first light signal from the at least one transmitter component (2) being coupled into the waveguide (51) of the planar optical circuit (5); and
    a second light signal being coupled out from the waveguide (51) of the planar optical circuit (5) and being guided onto the at least one receiver component (3, 4),
    characterized in that:
        the at least one transmitter component (2) and the at least one receiver component (3, 4) in this case being situated outside the plane in which the integrated waveguide (51) is formed in the planar optical circuit (5);
        the lens (14, 15) being arranged on the planar 25 optical circuit (5);
        the first light signal being guided between the lens (14, 15), on the one hand, and the at least one transmitter component (2) and the second light signal to the at least one receiver component (3, 4) in the integrated waveguide (51);
        the lens (15) is arranged at the end side on an end area (55) of the planar optical circuit (5) and in this case in a manner directly adjoining the end area of the integrated waveguide (51) of the planar optical circuit (5);
        the lens (15) is fixed to the end area (55) of the planar optical circuit (5) by means of an indexed-matched adhesive;
        the lens (15) is formed as a planoconvex lens and the plane side (15a) is fixed to the end area (55) of the planar optical circuit (5);
        a plurality of receiver components (3, 4) are provided and these in each case detect light having a different wavelength, the waveguide (51) in each case having coupling-out and deflection means (91, 92, 8) which couple out the received light for each received wavelength wavelength-selectively from the plane of the planar optical circuit (5) and guide it onto the assigned receiver component (3, 4); and
        the coupling-out and deflection means are in each case formed by a Mach-Zehnder component (91, 92) and an assigned deflection prism (8), light having a specific wavelength being coupled out from the waveguide (51) by the Mach-Zehnder component (91, 92), being fed to the deflection prism (8) and being deflected by the latter onto the at least one receiver component (3, 4).

2. An optical transmitter and receiver assembly comprising:
    at least one transmitter component;
    a plurality of receiver components;
    a lens which serves for the optical coupling of the transmitter component and the receiver components to an optical fiber that can be fixed to the transmitter and receiver assembly;
    a planar optical circuit consisting of one integrated waveguide, light from the transmitter component being coupled into the waveguide of the planar optical circuit and light being coupled out from the waveguide of the planar optical circuit and being guided onto the receiver components, the transmitter component and the receiver components being situated outside the plane in which the integrated waveguide is formed in the planar optical circuit, the lens being arranged on the planar optical circuit, the light being guided between the lens on the one hand, and the transmitter component and the receiver components on the other hand, in the integrated waveguide; and
    coupling-out and deflection means which couple out the received light for each received wavelength wavelength-selectively from the planar optical circuit and guide it onto a selected receiver component,
    wherein
        the lens is arranged in a cutout on the surface of the planar optical circuit,
        the cutout is formed in the shape of a truncated pyramid,
        the lens is arranged at the end side on an end area of the planar optical circuit directly adjoining the end area of the integrated waveguide of the planar optical circuit,
        the lens is fixed to the end area of the planar optical circuit by means of an index-matched adhesive,
        the lens is formed as a planoconvex lens having a plane side and the plane side is fixed to the end area of the planar optical circuit,
        each of said plurality of receiver components detect light having a different wavelength, and
        the coupling-out and deflection means comprise a Mach-Zehnder component and a selected deflection prism, light having a selected wavelength being coupled out from the waveguide by the Mach-Zehnder component, being fed to the selected deflection prism and being deflected by the latter onto a selected receiver component.

* * * * *